(12) United States Patent
Yamada

(10) Patent No.: US 12,115,825 B2
(45) Date of Patent: Oct. 15, 2024

(54) WORK VEHICLE AND CONTROLLER FOR WORK VEHICLE

(71) Applicant: KUBOTA CORPORATION, Osaka (JP)

(72) Inventor: Shinya Yamada, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 1 day.

(21) Appl. No.: 17/986,939

(22) Filed: Nov. 15, 2022

(65) Prior Publication Data

US 2023/0150330 A1    May 18, 2023

(30) Foreign Application Priority Data

Nov. 17, 2021 (JP) .................................. 2021-186896

(51) Int. Cl.
| | |
|---|---|
| *B60G 17/016* | (2006.01) |
| *B60G 17/015* | (2006.01) |
| *B60G 17/0195* | (2006.01) |
| *B60G 17/08* | (2006.01) |
| *B62D 49/08* | (2006.01) |
| *B62D 49/06* | (2006.01) |

(52) U.S. Cl.
CPC ..... *B60G 17/0162* (2013.01); *B60G 17/0152* (2013.01); *B60G 17/0195* (2013.01); *B60G 17/08* (2013.01); *B62D 49/08* (2013.01); *B60G 2202/24* (2013.01); *B60G 2204/62* (2013.01); *B60G 2300/082* (2013.01); *B60G 2400/0513* (2013.01); *B60G 2400/052* (2013.01); *B60G 2400/0523* (2013.01); *B60G 2400/41* (2013.01); *B60G 2400/60* (2013.01); *B60G 2400/97* (2013.01); *B60G 2500/30* (2013.01); *B60G 2600/182* (2013.01); *B60G 2800/914* (2013.01); *B62D 49/06* (2013.01)

(58) Field of Classification Search
CPC ............ B60G 17/0162; B60G 17/0195; B60G 2204/62; B60G 2400/0513; B60G 2400/052; B60G 2400/0523; B60G 2400/41; B62D 49/08
See application file for complete search history.

(56) References Cited

U.S. PATENT DOCUMENTS

| | | | |
|---|---|---|---|
| 6,332,104 B1 | 12/2001 | Brown et al. | |
| 7,467,684 B2 * | 12/2008 | Wang ........................ | F02K 9/00 |
| | | | 280/5.506 |
| 7,798,498 B2 * | 9/2010 | Buma ................ | B60G 21/0555 |
| | | | 280/5.511 |

(Continued)

FOREIGN PATENT DOCUMENTS

| | | |
|---|---|---|
| CN | 113015427 A | 6/2021 |
| EP | 1 118 507 A1 | 7/2001 |

(Continued)

*Primary Examiner* — Frank B Vanaman
(74) *Attorney, Agent, or Firm* — Keating & Bennett, LLP

(57) ABSTRACT

A work vehicle includes a vehicle body, running gear to cause the vehicle body to travel, a height adjuster to change a height of a center of gravity of the vehicle body, and a controller configured or programmed to, in accordance with at least one of a turning radius and an angular velocity of the vehicle body during a turn, control the height adjuster to maintain or lower the height of the center of gravity.

9 Claims, 12 Drawing Sheets

(56) References Cited

U.S. PATENT DOCUMENTS

| | | | | |
|---|---|---|---|---|
| 8,275,516 | B2 * | 9/2012 | Murphy | B60W 50/14 |
| | | | | 701/124 |
| 8,478,484 | B2 | 7/2013 | Marur | |
| 2007/0114074 | A1 * | 5/2007 | Jansson | B62D 25/20 |
| | | | | 280/124.1 |
| 2009/0057065 | A1 * | 3/2009 | Akaki | B60W 10/18 |
| | | | | 187/223 |
| 2014/0081542 | A1 * | 3/2014 | Yao | B60W 10/06 |
| | | | | 701/124 |
| 2021/0389771 | A1 | 12/2021 | Nishii | |
| 2022/0287219 | A1 | 9/2022 | Yoshimura et al. | |
| 2023/0010344 | A1 * | 1/2023 | Seymour | B60L 15/2045 |

FOREIGN PATENT DOCUMENTS

| | | |
|---|---|---|
| JP | 2001000031 A | 1/2001 |
| JP | 2001071929 A | 3/2001 |
| JP | 2012-224338 A | 11/2012 |
| JP | 2017-134471 A | 8/2017 |
| JP | 2020030760 A | 2/2020 |
| JP | 2021-017150 A | 2/2021 |
| JP | 2021-095047 A | 6/2021 |

* cited by examiner

WORK VEHICLE AND CONTROLLER FOR WORK VEHICLE

CROSS-REFERENCE TO RELATED APPLICATION

This application claims priority to Japanese Patent Application No. 2021-186896 filed on Nov. 17, 2021, the entire contents of which are hereby incorporated by reference.

BACKGROUND OF THE INVENTION

1. Field of the Invention

The present disclosure relates to a work vehicle and a controller for a work vehicle.

2. Description of the Related Art

Some work vehicles for agricultural use, such as tractors, have models equipped with the function of turning at a smaller turning radius than they would in a usual turn. For example, work vehicles are prevalent that have a front wheel speed increaser which, when the front wheel is steered by a predetermined angle or greater, reduces the turning radius by increasing the rotational speed of the outer front wheel over the rotational speeds of the right and left rear wheels. Such a work vehicle is able to smoothly turn while keeping itself from messing the soil on the field surface. Japanese Laid-Open Patent Publication No. 2017-134471 discloses an example of a work vehicle having such a front wheel speed increaser.

On the other hand, work vehicles equipped with a suspension mechanism at the vehicle front for absorbing vibration and shock during travel for improved riding comfort have also become prevalent. The suspension mechanism provided at the vehicle front is called a "front suspension". In tractors or other work vehicles, the load undergoes large changes. Thus, a hydraulic front suspension is commonly adopted to ensure an adequate suspension stroke. Japanese Laid-Open Patent Publication No. 2012-224338 discloses an example of a work vehicle having a hydraulic front suspension.

Japanese Laid-Open Patent Publication No. 2021-17150 discloses a suspension controller for properly preventing a vehicle such as a truck from becoming overturned during a sharp turn. The vehicle disclosed in Japanese Laid-Open Patent Publication No. 2021-17150 includes a pair of suspension members that allow for vehicle height adjustments. Based on the steering angle and steering angular velocity of the vehicle during travel, the suspension controller, when it is estimated that the turning radius of the vehicle immediately afterwards will be smaller than a predetermined value, controls the suspension members so as to increase the vehicle height on the outer side of the vehicle's turn. Japanese Laid-Open Patent Publication No. 2021-17150 describes that this can properly prevent the vehicle from becoming overturned during a sharp turn.

SUMMARY OF THE INVENTION

When a work vehicle turns with a small turning radius or a high speed, a strong centrifugal force acts in the outer direction of the turn. As a result of this, the tilt of the work vehicle may increase, possibly resulting in poorer riding comfort or loss of balance.

Preferred embodiments of the present invention provide techniques for reducing or preventing tilting when a work vehicle turns with a small turning radius or a high speed to achieve a more stable turn.

A work vehicle according to an implementation of the present disclosure includes a vehicle body, running gear to cause the vehicle body to travel, a height adjuster to change a height of a center of gravity of the vehicle body, and a controller configured or programmed to, in accordance with at least one of a turning radius and an angular velocity of the vehicle body during a turn, control the height adjuster to maintain or lower the height of the center of gravity.

A controller according to another implementation of the present disclosure controls a work vehicle including a vehicle body, running gear to cause the vehicle body to travel, and a height adjuster to change a height of a center of gravity of the vehicle body. The controller includes one or more processors, and one or more memories storing a computer program to be executed by the one or more processors. The one or more processors is configured or programmed to acquire, during a turn, information concerning at least one of a turning radius and an angular velocity of the vehicle body, and control the height adjuster to maintain or lower the height of the center of gravity in accordance with the information.

General or specific aspects of various example preferred embodiments of the present disclosure may be implemented using a device, a system, a method, an integrated circuit, a computer program, a non-transitory computer-readable storage medium, or any combination thereof. The computer-readable storage medium may be inclusive of a volatile storage medium, or a non-volatile storage medium. The device may include a plurality of devices. In the case where the device includes two or more devices, the two or more devices may be disposed within a single apparatus, or divided over two or more separate apparatuses.

According to certain preferred embodiments of the present disclosure, tilting of a work vehicle during a turn is reduced or prevented, and the turning stability is improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
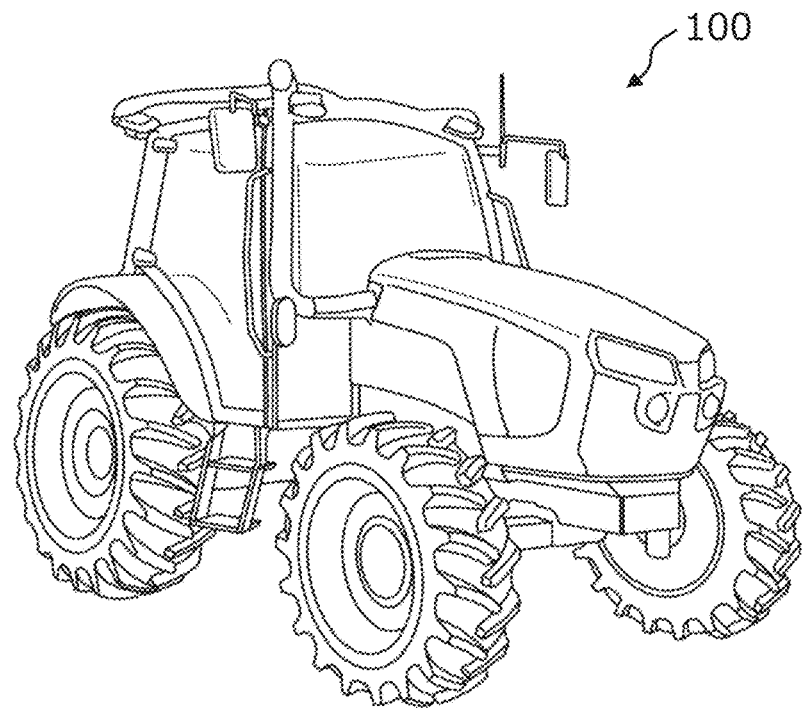
FIG. 1 is a perspective view showing an exemplary appearance of a work vehicle according to an illustrative preferred embodiment of the present invention.

Hereinafter, preferred embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following preferred embodiments are only exemplary, and the techniques of the present disclosure are not limited to the following preferred embodiments. For example, numerical values, shapes, materials, steps, and orders of steps, etc., that are indicated in the following preferred embodiments are only exemplary, and admit of various modifications. Any one implementation may be combined with another so long as it makes technological sense to do so.

Hereinafter, preferred embodiments where the work vehicle is a tractor will be described as an example. Without being limited to tractors, the techniques according to the present disclosure are also applicable to other types of agricultural machines, e.g., rice transplanters, combines, vehicles for crop management, and riding lawn mowers. The techniques according to the present disclosure are also applicable to work vehicles for use in non-agricultural applications, e.g., construction vehicles or snowplow vehicles.

Figure 2:
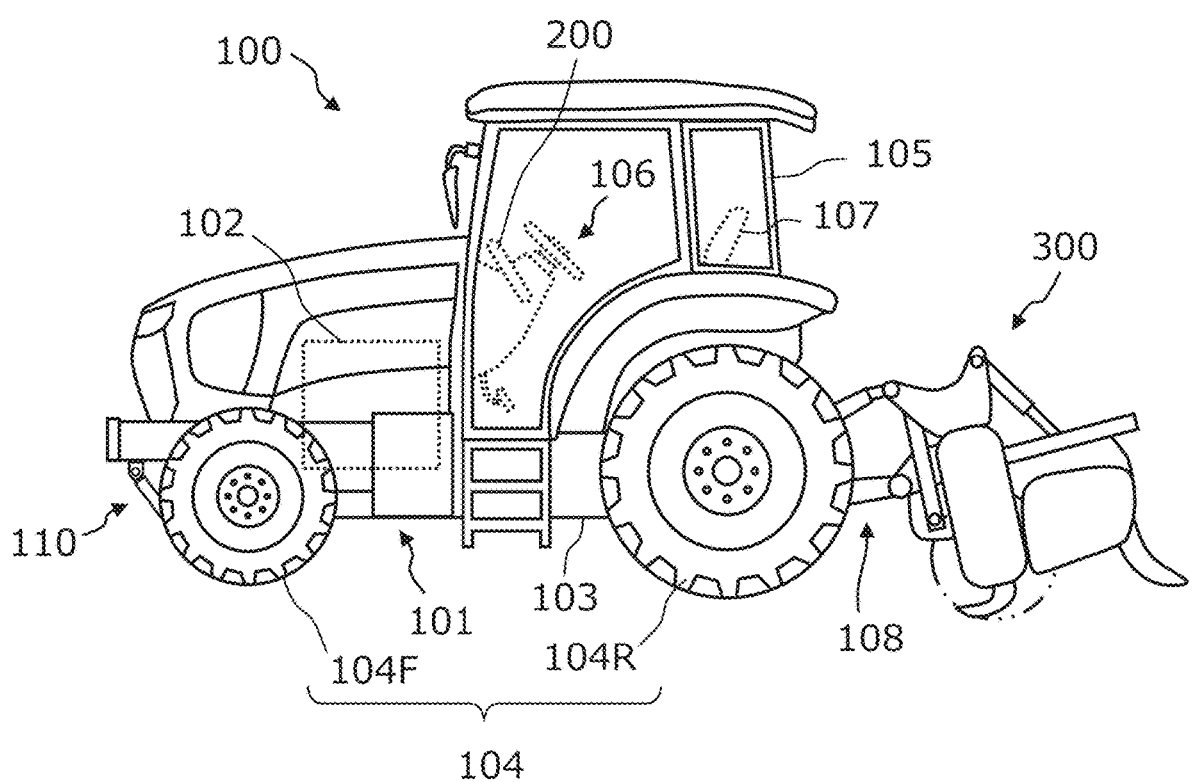
FIG. 2 is a side view schematically showing the work vehicle and an example of an implement that is linked to the work vehicle.

FIG. 1 is a perspective view showing an exemplary appearance of a work vehicle according to an illustrative preferred embodiment of the present disclosure. The work vehicle 100 according to the present preferred embodiment is a tractor for use with agricultural work in a field (e.g., an agricultural field, an orchard, or a paddy field). FIG. 2 is a side view schematically showing the work vehicle 100 and an example of an implement 300 that is linked to the work vehicle 100.

As shown in FIG. 2, the work vehicle 100 includes a vehicle body 101, a prime mover (engine) 102, a transmission 103, running gear 104 to cause the vehicle body 101 to travel, and an adjusting device 110 (height adjuster) to change the height of the center of gravity of the vehicle body 101. A cabin 105 is provided on the vehicle body 101. The running gear 104 includes four wheels (a pair of front wheels 104F and a pair of rear wheels 104R), a wheel axis for rotating the four wheels, and a braking device to apply braking to each wheel. Inside the cabin 105, a driver's seat 107, a steering device 106, an operational terminal 200, and switches for manipulation are provided. The work vehicle 100 is able to switch between a four-wheel drive (4W) mode in which all of the front wheels 104F and the rear wheels 104R serve as driving wheels, and a two-wheel drive (2W) mode in which only the front wheels 104F or only the rear wheels 104R serve as the driving wheels.

The prime mover 102 may be a diesel engine, for example. Instead of a diesel engine, an electric motor may be used. The transmission 103 can change the propulsion and moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as a "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. The work vehicle 100 may have an automatic steering function. When automatic steering is performed, under the control of a controller disposed in the work vehicle 100, the steering angle of the front wheels 104F may be automatically adjusted by the power of the hydraulic device or electric motor.

A linkage device 108 is provided at the rear of the vehicle body 101. The linkage device 108 may include, e.g., a three-point linkage (also referred to as a "three-point link" or a "three-point hitch"), a PTO (Power Take Off) shaft, a universal joint, and a communication cable. The linkage device 108 allows the implement 300 to be attached to or detached from the work vehicle 100. The linkage device 108 is able to raise or lower the three-point linkage device with a hydraulic device, for example, thus controlling the position and/or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided frontward of the vehicle body 101. In that case, the implement may be connected frontward of the work vehicle 100.

Although the implement 300 shown in FIG. 2 is a rotary tiller, the implement 300 is not limited to a rotary tiller. For example, any arbitrary implement such as a mower, a seeder, a spreader, a rake implement, a baler, a harvester, a sprayer, or a harrow, may be connected to the work vehicle 100 for use. The work vehicle 100 may travel without the implement 300 being attached thereto.

The running gear 104 may include a front wheel speed increaser which causes the outer front wheel 104F to rotate more rapidly than the inner front wheel 104F and the right and left rear wheels 104R during a turn, thus to reduce the turning radius. The front wheel speed increaser may increase the rotational speed(s) of the front wheel(s) 104F when the steering angle of the front wheels 104F has reached a predetermined angle or greater as the driver turns the steering wheel to a great extent, for example. By increasing the rotational speed of the outer front wheel 104F to approximately, e.g., 1.5 to 2.5 times of the rotational speed of the outer rear wheel 104R, the front wheel speed increaser can reduce the turning radius of the work vehicle 100. This allows the work vehicle 100 to smoothly turn in a small space, while keeping itself from messing the soil on the field surface. Such a turn may be referred to as a "bi-speed turn" in the present specification. When the front wheel speed increaser increases the rotational speed(s) of the front wheel(s) 104F, a control of automatically braking the inner rear wheel 104R may be performed. Braking the inner rear wheel 104R in addition to increasing the rotational speed(s) of the front wheel(s) 104F allows the turning radius to be further reduced. By manipulating the operational terminal 200 or the switches within the cabin 105, the driver is able to set: whether the front wheel speed increasing function is enabled/disabled; how much the rotational speed(s) of the front wheel(s) 104F is to be increased during a turn; and whether or not the rear wheels 104R are braked and the degree of such braking during a turn.

Although a bi-speed turn can be made within a small circle, a stronger centrifugal force will act in a bi-speed turn than in a turn which is made at the same vehicle speed but not in the manner of a bi-speed turn. A strong centrifugal force may cause the body of the vehicle to tilt during a turn, thus detracting from the riding comfort, or resulting in a loss of balance.

Figure 3:
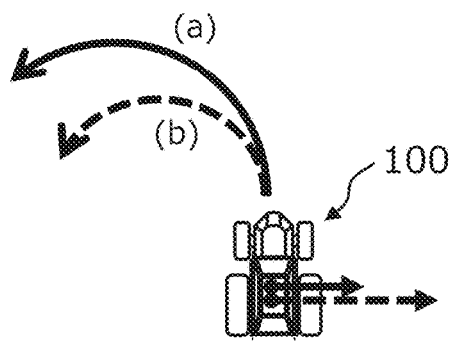
FIG. 3 is a diagram schematically showing a strong centrifugal force at work when the work vehicle is making a small turn.
Figure 4:
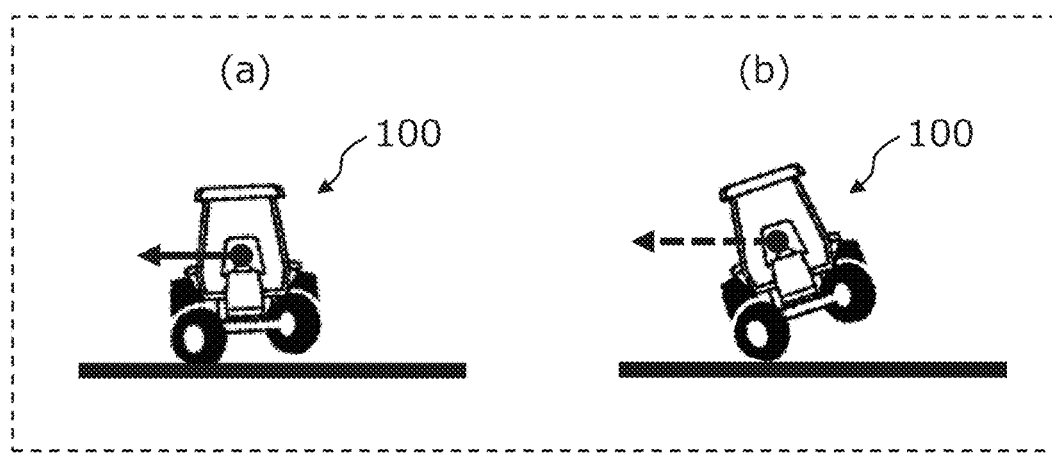
FIG. 4 is a diagram schematically showing a strong centrifugal force at work when the work vehicle is making a small turn.

FIG. 3 and FIG. 4 are diagrams schematically showing a strong centrifugal force at work when the work vehicle 100 is making a small turn via bi-speed turn. In FIG. 3, a curved arrow (a) in solid line represents an example locus of the work vehicle 100 during a usual turn, while a curved arrow (b) in broken line represents an example locus of the work vehicle 100 during a small turn via bi-speed turn. A straight arrow in solid line represents a centrifugal force during a usual turn, while a straight arrow in broken line represents a centrifugal force during a small turn. An object having a mass m, which undergoes a circular motion with a velocity v and a radius r (angular velocity v/r), receives a centrifugal force with a magnitude of $mv^2/r$ in the outer direction of the circular motion. Therefore, the turning work vehicle 100 is subject to a centrifugal force which is, in the outer direction of the turn, essentially in proportion to its velocity raised to the second power and its weight, and which is in inverse proportion to the turning radius. Therefore, given the same vehicle speed, a greater centrifugal force than in a usual turn is at work during a small turn. Consequently, as shown in FIG. 4, the body of the vehicle is more likely to tilt and become unbalanced during a small turn (b) than during a usual turn (a). In particular, when the center of gravity of the work vehicle 100 is high or when the interval between the right and left wheels (i.e., tread) of the work vehicle 100 is narrow, the body of the vehicle is likely to have a large tilt due to centrifugal force. This problem may occur not only when making a bi-speed turn, but commonly when any turn is made with a small turning radius or a high velocity (i.e., a high angular velocity).

In the present preferred embodiment, in order to reduce or prevent tilting of the body of the vehicle during a small turn and to achieve a stable turn, the work vehicle 100 includes the adjusting device 110 (height adjuster), which changes the height of the center of gravity of the vehicle body 101. As used herein, "height" means a height (i.e., distance) from the ground surface on which the work vehicle 100 is traveling. The adjusting device 110 may include a suspension device that changes the height of the front of the vehicle body 101, for example. In the example shown in FIG. 2, the adjusting device 110 includes a hydraulic suspension device provided at the lower front of the vehicle body 101. By controlling such a suspension device, the height of the center of gravity of the vehicle body 101 can be adjusted. Without being limited to a suspension device provided at the front of the vehicle body 101, the adjusting device 110 may be configured to adjust the center of gravity of the vehicle body 101 by other mechanisms. For example, suspension mechanisms may be provided at both the front and the rear of the vehicle body 101. Alternatively, the adjusting device 110 may be implemented by a mechanism that raises or lowers a weight provided at a predetermined position (e.g., the bottom, the front, the side, or the rear) of the vehicle body 101.

The adjusting device 110 is controlled by a controller, such as an electronic control unit (ECU), that is included in the work vehicle 100. In accordance with at least one of the turning radius and the angular velocity of the vehicle body 101 during a turn, the controller is configured or programmed to control the adjusting device 110 to maintain or lower the height of the center of gravity of the vehicle body 101. For example, the controller controls the adjusting device 110 to lower the center of gravity when a state of a small turn is entered during a turn, i.e., a state where the turning radius is smaller than a reference radius, and if the height of the center of gravity of the vehicle body 101 is higher than a reference height. Even in a state of a small turn, if the height of the center of gravity is equal to or lower than the reference height, the controller does not lower the center of gravity but maintains its height. For example, if at the beginning of the turn the center of gravity of the vehicle body 101 is already close to the lowest height within a controllable range, then the controller maintains that height of the center of gravity.

Figure 5:
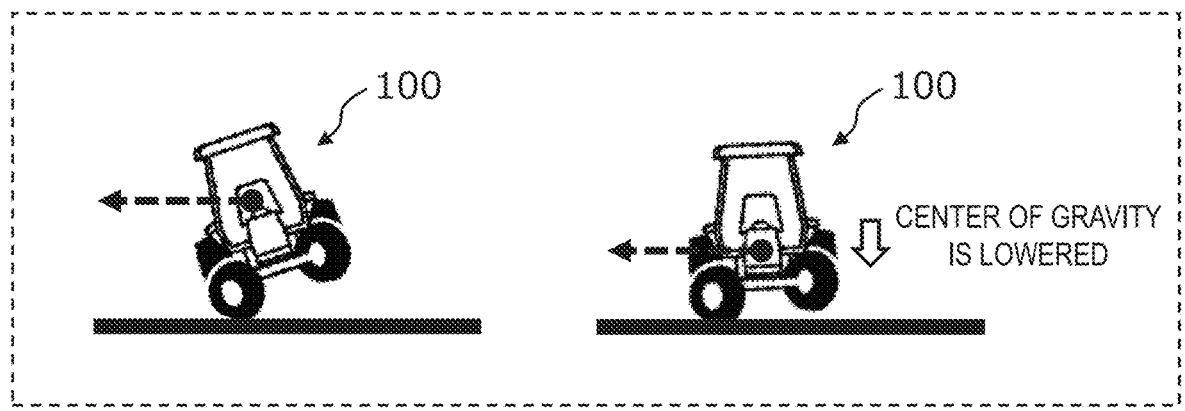
FIG. 5 is a diagram schematically illustrating an effect obtained by lowering the center of gravity of a vehicle body when the turning radius is small.

FIG. 5 is a diagram schematically illustrating an effect obtained by lowering the center of gravity of the vehicle body 101 when the turning radius is small (i.e., the angular velocity is high). The left side of FIG. 5 depicts an example of the work vehicle 100 during a turn where the control for the center of gravity is not performed. The right of FIG. 5 depicts an example of the work vehicle 100 during a turn where the control for the center of gravity according to the present preferred embodiment is performed. As shown in the right side of FIG. 5, by lowering the center of gravity, the tilt of the work vehicle 100 caused by centrifugal force is reduced or prevented. This achieves improvement in the stability of the work vehicle 100 during a small turn.

As described above, the running gear 104 may include a front wheel speed increaser. In that case, the running gear 104 can operate in a small turn mode where the rotational speed of the outer front wheel 104F is made higher than the rotational speed(s) of the two rear wheels 104R during a turn so that the turning radius becomes smaller than the reference radius. A turn made in the small turn mode corresponds to the aforementioned "bi-speed turn". The controller may include a first control circuit to control the running gear 104 and a second control circuit to control the adjusting device 110. When the angle of rotation of the steering wheel or the steering angle of the front wheels 104F has exceeded a reference angle, the first control circuit causes the running gear 104 to operate in the small turn mode. When the small turn mode is begun while the height of the center of gravity of the vehicle body 101 is higher than the reference height, the second control circuit causes the adjusting device 110 to lower the center of gravity of the vehicle body 101. With such a configuration, the second control circuit is able to cause the adjusting device 110 to lower the center of gravity of the vehicle body 101 in response to a signal which is output from the first control circuit indicating the start of the small turn mode. Thus, adjustments of the center of gravity can be made without having to separately provide a sensor to detect a state of a small turn.

In the small turn mode, the running gear 104 may have the function of automatically braking the inner one of the two rear wheels 104R. In that case, the first control circuit may be configured to control the presence or absence of braking or intensity of braking on the inner rear wheel. The second control circuit may cause at least one of the amount of lowering the center of gravity and the reference height to vary in accordance with the presence or absence of braking or intensity of braking. When the inner rear wheel 104R is braked, the turning radius is further reduced such that the centrifugal force is further increased. Therefore, in the case where a small turn is made with the braking of the inner rear wheel 104R, the condition for lowering the center of gravity may be more relaxed than when a small turn is made without such braking.

The controller may perform the aforementioned control for the center of gravity even in the case where a bi-speed turn is not enabled, or in the case where the work vehicle 100 lacks bi-speed turn functionality. The work vehicle 100 may include an angular velocity sensor that is capable of measuring the angular velocity of the vehicle body 101, e.g., an inertial measurement unit (IMU). In that case, the controller may cause the adjusting device 110 to lower the center of gravity when the angular velocity of a yawing (i.e., rotational motion around an axis in the top-bottom direction of the vehicle) of the vehicle body 101 as measured by the angular velocity sensor has become equal to or greater than a threshold, and if the height of the center of gravity is higher than the reference height. With such a configuration, it is possible to adjust the center of gravity based on the result of measurement by the angular velocity sensor, even in the case where a bi-speed turn is not enabled or where the work vehicle 100 lacks bi-speed turn functionality.

The controller may change at least one of the amount of lowering the center of gravity and the reference height in accordance with at least one of the turning radius, the angular velocity, and the weight of the work vehicle. Moreover, the controller may change the reference radius in accordance with at least one of the speed and the weight of the work vehicle 100. The magnitude of the centrifugal force depends on the turning radius, the speed of the work vehicle 100, the angular velocity of the work vehicle 100, and the weight of the work vehicle 100. Therefore, based on these conditions, the controller may change at least one of the amount of lowering the center of gravity, the reference height, and the reference radius. For example, the controller may increase the amount of lowering the center of gravity or lower the reference height as the turning radius decreases (or the angular velocity increases) or as the weight increases. Moreover, the controller may increase the reference radius as the speed of the work vehicle 100 increases or as the weight increases.

The controller may change at least one of the amount of lowering the center of gravity, the reference height, and the reference radius in accordance with the type of the implement 300 linked to the work vehicle 100 or the presence or absence of the implement 300. Once the implement 300 is attached, the center of gravity of the system combining the work vehicle 100 and the implement 300 may become higher than the center of gravity of the work vehicle 100 alone, etc., which makes tilting more likely. Therefore, when the implement 300 has been attached, the controller may increase the amount of lowering the center of gravity, lower the reference height, or increase the reference radius, relative to when no implement 300 is attached.

As in the example shown in FIG. 2, when the adjusting device 110 includes a suspension device, the controller may control the suspension device to change the height of the center of gravity. Hereinafter, an exemplary configuration and an exemplary control for the suspension device will be described.

Figure 6:
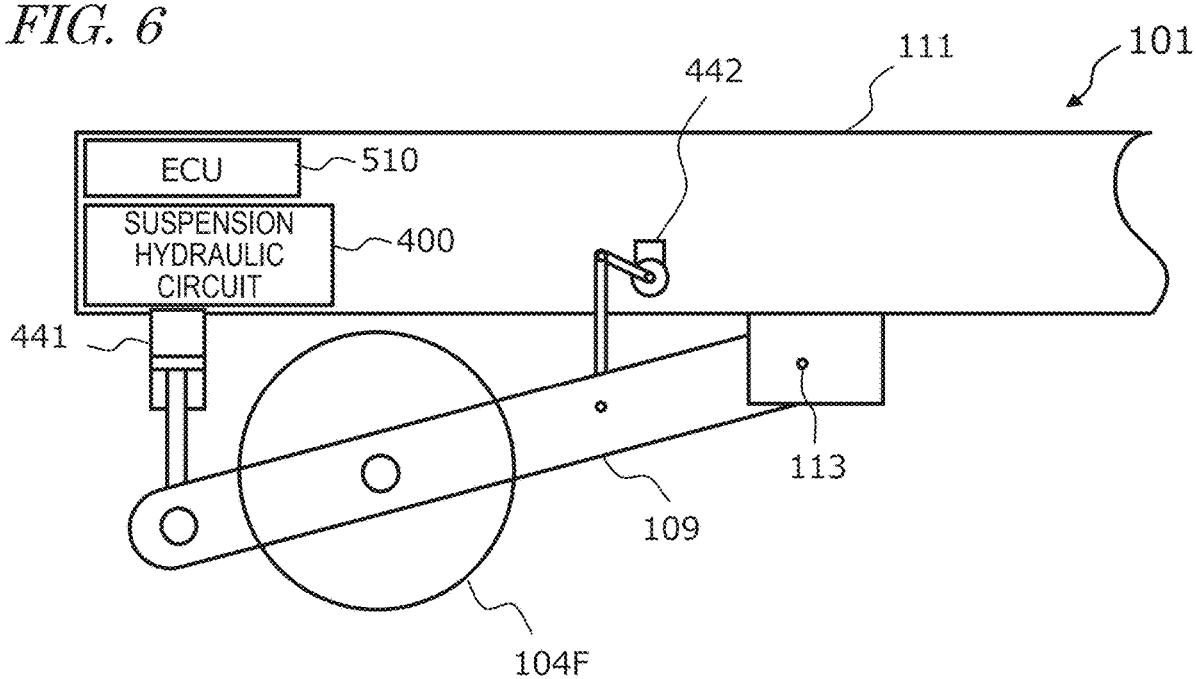
FIG. 6 is a conceptual diagram showing a schematic configuration of a suspension device.

FIG. 6 is a conceptual diagram showing a schematic configuration of the suspension device. By hydraulic action, this suspension device is able to change the height of a front wheel axis frame 111 that is provided at the front of the vehicle body 101. As an example of the controller, FIG. 6 illustrates an ECU 510. Without being limited to the illustrated position, the ECU 510 may be disposed at any arbitrary position. The running gear in this example includes two supports 109 for respectively supporting the two front wheels 104F. The suspension device includes: two hydraulic suspension cylinders 441 which are provided near the right and left front wheels 104F; and a hydraulic circuit 400 that is connected to the two hydraulic suspension cylinders 441. In FIG. 6, the front wheel 104F, the support 109, and the suspension cylinder 441 on the left side are illustrated. The support 109 is mounted to the front wheel axis frame 111 at one end thereof, so as to be capable of swinging up and down around a spindle 113. The suspension cylinder 441 interconnects a portion of the support 109 and the front wheel axis frame 111. The hydraulic circuit 400 adjusts the amount and pressure of hydraulic oil to be supplied to each suspension cylinder 441. By controlling the hydraulic circuit 400, the ECU 510 controls the extension/retraction action of the suspension cylinders 441.

On the front wheel axis frame 111 and the support 109, a stroke sensor 442 is mounted to detect an extended or retracted state of the suspension cylinder 441. The stroke sensor 442 shown in FIG. 6 includes a rotary displacement potentiometer. The stroke sensor 442 outputs a signal which is in accordance with the stroke length of the suspension cylinder 441. Based on the signal which is output from the stroke sensor 442, the ECU 510 calculates the stroke length of the suspension cylinder 441. By controlling each control valve in the hydraulic circuit 400 based on the results of calculation, the ECU 510 is able to adjust the stroke length to a desired length.

Figure 7:
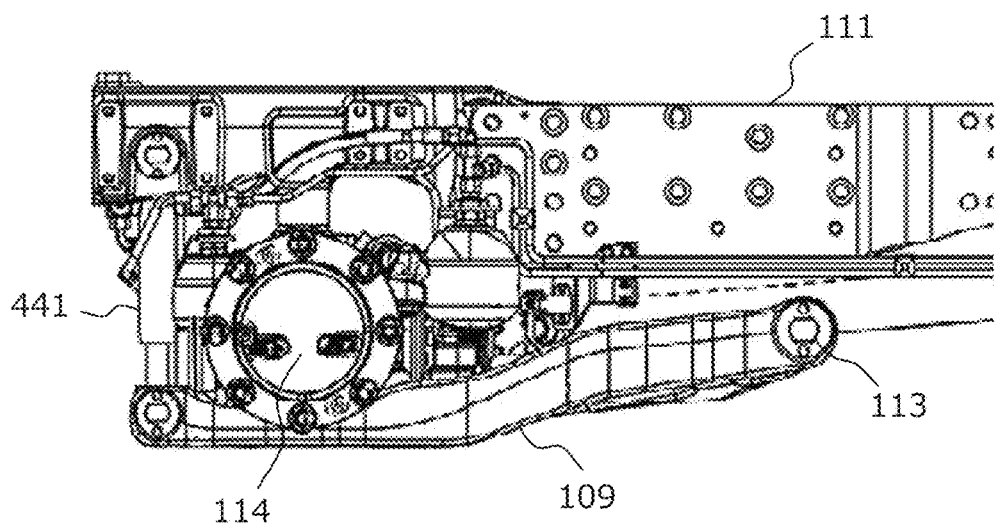
FIG. 7 is a side view showing a specific example of the structure of the suspension device.

FIG. 7 is a side view showing a more specific example of the structure of the suspension device. The rear end of the support 109 is supported by the spindle 113, which is located below the front wheel axis frame 111 and which extends along the right-left direction with respect to the vehicle's traveling direction. The support 109 is supported so as to be capable of swinging around the spindle 113. The front wheel axis 114 is located frontward and upward from the support 109. To the front wheel axis 114, a transmission system to transmit a motive force for traveling via a universal joint and the like is connected. The front wheels 104F are mounted on the front wheel axis 114.

Between the front ends of the right and left supports 109 and the two positions at the front of the front wheel axis frame 111, two hydraulic suspension cylinders 441 are respectively connected. The two suspension cylinders 441 are controlled by the ECU 510 to extend or retract in conjunction with the up and down movements of the front wheel 104F. To each suspension cylinder 441, hydraulic oil is supplied from the hydraulic circuit 400. As the ECU 510 controls supply and discharge of the hydraulic oil, the suspension cylinders 441 function as springs. As a result of this, shocks during travel are absorbed so as to provide an improved riding comfort.

Figure 8:
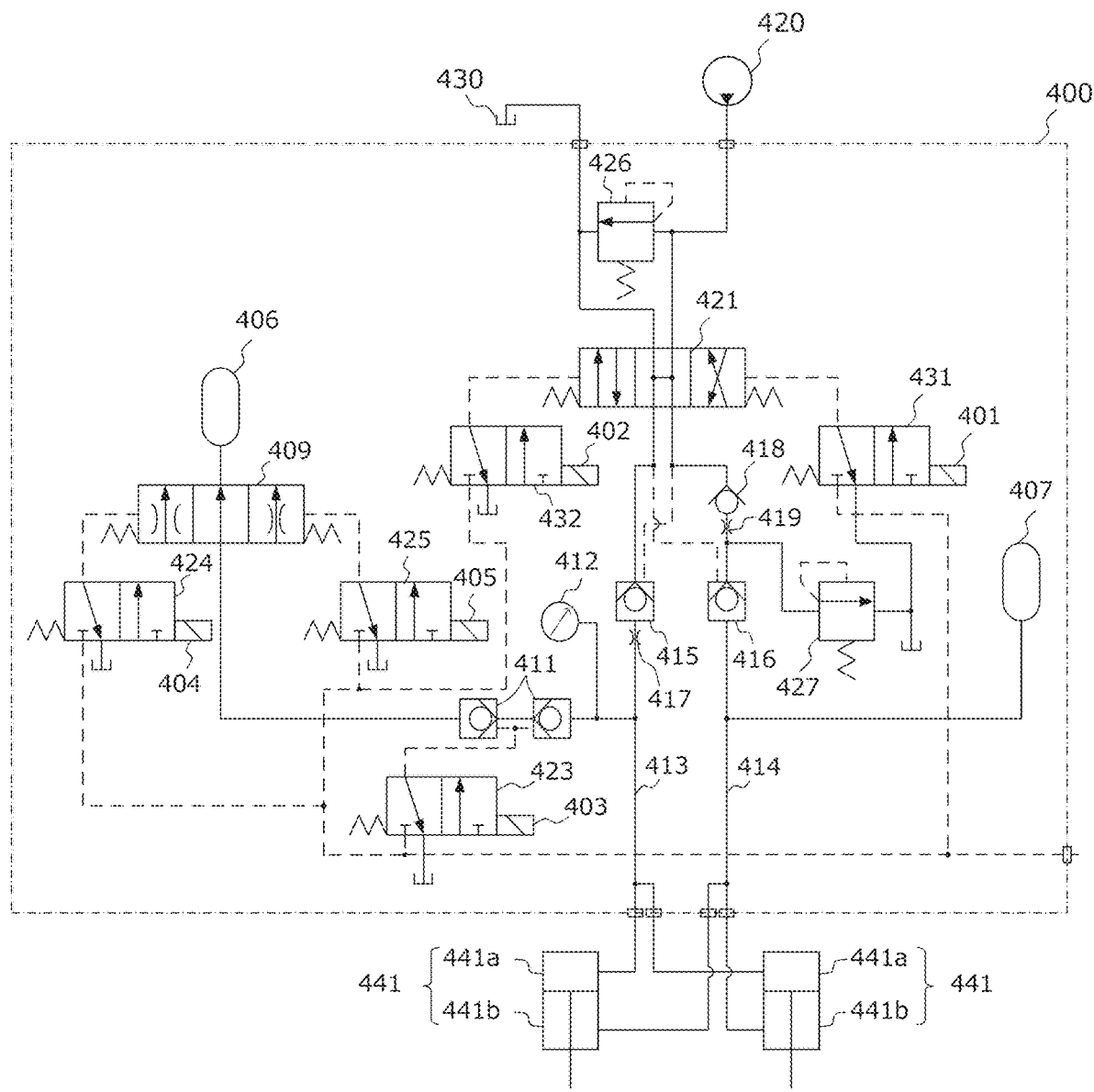
FIG. 8 is a diagram showing a schematic configuration for a hydraulic circuit.

FIG. 8 is a diagram showing an exemplary schematic configuration for the hydraulic circuit 400. The suspension cylinders 441 are disposed in such an attitude that piston rods protrude downward therefrom. Each suspension cylinder 441 includes a head-side oil chamber 441*a* and a rod-side oil chamber 441*b*. A first oil channel 413 is connected to the upper (head-side) oil chamber 441*a*. A second oil channel 414 is connected to the lower (rod-side) oil chamber 441*b*.

To the first oil channel 413, a head-side accumulator 406 is connected via a pilot-operated double check valve 411. In an oil channel between the head-side accumulator 406 and the double check valve 411, a pilot-operated variable orifice 409 is provided. To an oil channel between the double check valve 411 and the first oil channel 413, a pressure sensor 412 is connected. A rod-side accumulator 407 is connected to the second oil channel 414.

A gas, e.g., nitrogen, is sealed inside the accumulators 406 and 407. The gas compresses as pressure increases in the oil channel connected thereto, and the gas expands as the pressure in the oil channel decreases. Through this action, a spring property is imparted to each suspension cylinder 441.

The variable orifice 409 has three positions associated with different orifice diameters. Two switching control valves 424 and 425 are provided, which allow the variable orifice 409 to be manipulated through control of a pilot pressure. By adjusting the flow of hydraulic oil to be supplied and discharged to and from the head-side accumulator 406, the variable orifice 409 is able to vary the stiffness (corresponding to the spring modulus) of the suspension. As the ECU 510 drives solenoids 404 and 405 in the switching control valves 424 and 425, the aperture of the variable orifice 409 can be switched in three steps of large, medium, and small. This allows the damping force of the suspension cylinders 441 to be switched in three steps. If the ECU 510 turns both solenoids 404 and 405 OFF, an aperture at the "large" position is inserted in the oil channel, whereby the damping force becomes minimum. If the ECU 510 turns the solenoid 404 ON, an aperture at the "medium" (left) position is inserted in the oil channel, whereby the damping force becomes intermediate. If the ECU 510 turns the solenoid 405 ON, an aperture at the "small" (right) position is inserted in the oil channel so that the damping force becomes maximum.

The hydraulic circuit 400 further includes an open/close control valve 423 to cause a pilot pressure to act on the double check valve 411. Through pilot pressure control by the open/close control valve 423, the double check valve 411 is switched between a closed state and an open state. By driving a solenoid 403 in the open/close control valve 423, the ECU 510 causes a pilot pressure to act on the double check valve 411 so as to open the double check valve 411.

When the double check valve 411 is opened, hydraulic oil flows between the head-side oil chamber 441*a* and the head-side accumulator 406, thus enabling suspension functionality. In the present specification, this state may be referred to as "suspension-ON". Conversely, when the double check valve 411 is in a closed state, the flow of hydraulic oil between the head-side oil chamber 441*a* and the head-side accumulator 406 is blocked. This keeps the suspension fixed. In the present specification, this state may be referred to as "suspension locking".

The hydraulic oil from the hydraulic pump 420, which is driven by the prime mover 102 (engine), is supplied to the pilot-operated main control valve 421. To the oil channel between the hydraulic pump 420 and the main control valve 421, a relief valve 426 is connected. When the pressure of the hydraulic oil reaches an upper limit value that was previously set, the relief valve 426 is opened to allow a portion of the hydraulic oil to return to the tank 430, so as to reduce or prevent an excessive pressure increase of the hydraulic oil.

The main control valve 421 is a 4-port 3-position directional control valve including a position-to-raise where hydraulic oil is supplied to the first oil channel 413 so as to extend the cylinders 441 and raise the vehicle height; a position-to-lower where hydraulic oil is supplied to the second oil channel 414 so as to retract the cylinders 441 and lower the vehicle height; and a neutral position where hydraulic oil is neither supplied nor discharged to/from the cylinders 441. Two operable valves 431 and 432 are provided in order to manipulate the main control valve 421 by allowing a pilot pressure to act thereon. To the first oil channel 413, a pilot-operated check valve 415 and a throttle 417 are connected. To the second oil channel 414, a pilot-operated check valve 416, a check valve 418 that opens or closes with hydraulic oil pressure, and a throttle 419 are connected. A relief valve 427 is connected to the oil channel between the check valve 418 and the check valve 416.

As the ECU 510 drives solenoids 401 and 402 in the operable valves 431 and 432, the raising and lowering of the cylinders 441 can be controlled. If the ECU 510 turns the solenoid 401 ON, the pilot pressure places the main control valve 421 in the position-to-raise such that hydraulic oil is supplied from the pump 420 to the head-side oil chamber 441*a*. As a result of this, the cylinders 441 extend, thus raising the center of gravity of the vehicle body 101. On the other hand, if the ECU 510 turns the solenoid 402 ON, the pilot pressure places the main control valve 421 in the position-to-lower such that hydraulic oil is supplied from the pump 420 to the rod-side oil chamber 441*b*. As a result of this, the cylinders 441 are retracted, thus lowering the center of gravity of the vehicle body 101. If the ECU 510 turns both solenoids 401 and 402 OFF, the main control valve 421 is switched to the neutral position. In this state, the cylinders 441 are isolated from the pump 420 and the tank 430 by the check valves 415 and 416. In this state, if the ECU 510 turns the solenoid 403 ON, the accumulators 406 and 407 and the cylinders 441 are coupled, so that the cylinders 441 act as springs extending or retracting in conjunction with up and down movements of the front wheel 104F. As the oil channel between the head-side oil chamber 441*a* and the head-side accumulator 406 is narrowed by the variable orifice 409, the moving speed of the hydraulic oil is regulated, so that the cylinders 441 function as dampers.

Figure 9:
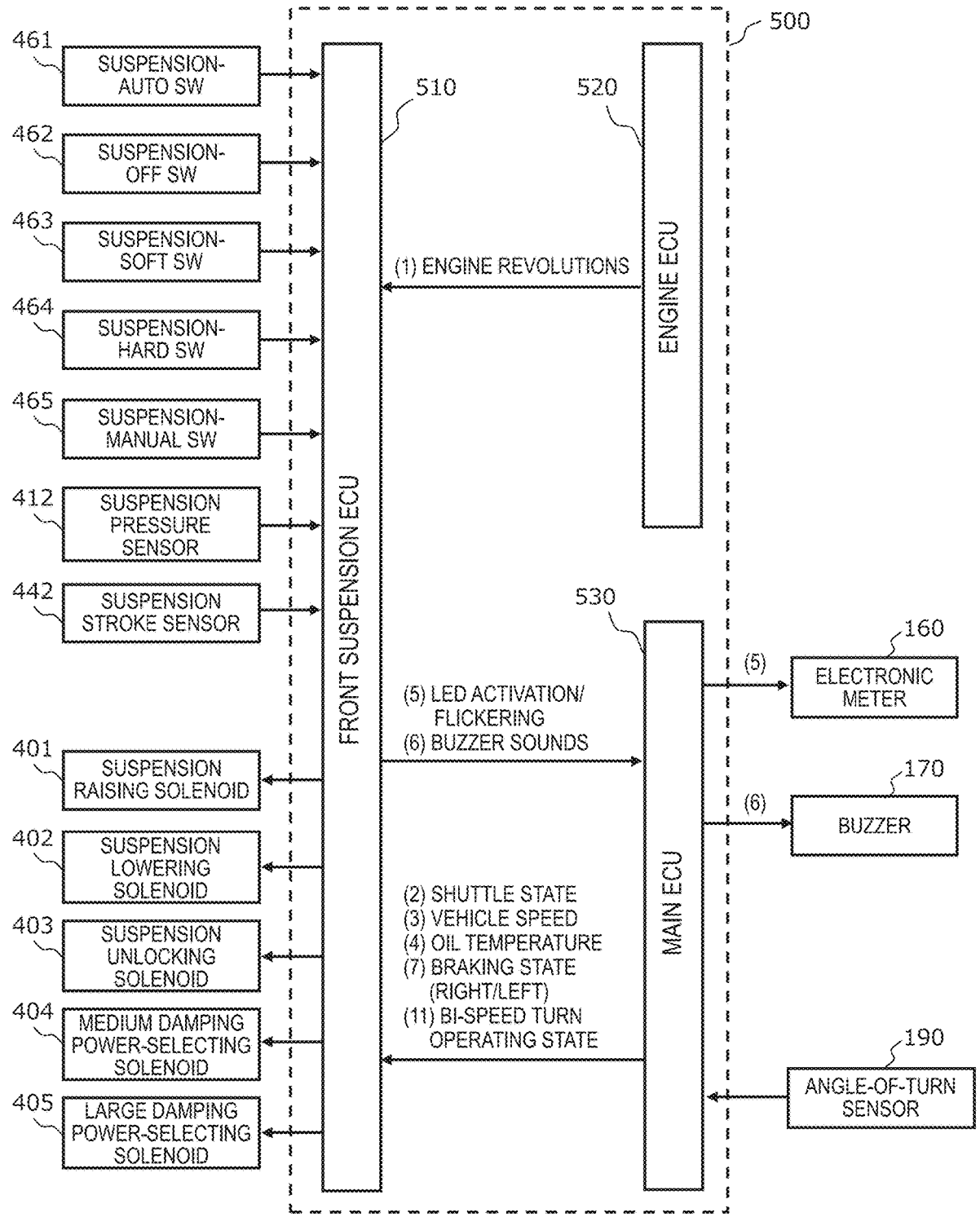
FIG. 9 is a block diagram showing an exemplary configuration for a front suspension control system.

FIG. 9 is a block diagram showing an exemplary configuration for a front suspension control system 500 according to the present preferred embodiment. The control system 500 includes a front suspension ECU 510, an engine ECU 520, and a main ECU 530. The front suspension ECU 510 controls the operation of the front suspension. The engine ECU 520 controls the operation of the engine. The main ECU 530 controls the overall operation of the work vehicle 100.

The ECUs 510, 520 and 530 may communicate with one another according to a vehicle bus standard such as CAN (Controller Area Network). Although the ECUs 510, 520 and 530 are illustrated as individual corresponding blocks in FIG. 9, each of these functions may be distributed among a plurality of ECUs. Alternatively, an onboard computer that integrates some or all of the functions of the ECUs 510, 520 and 530 may be provided. The control system 500 may include ECUs other than the ECUs 510, 520 and 530, and any number of ECUs may be provided in accordance with functionality. Each ECU includes a control circuit including one or more processors and one or more memories. The processor(s) operate by executing a computer program(s) stored in the memory(s). In the present preferred embodiment, the main ECU 530 is configured or programmed to perform the function of the aforementioned first control circuit, whereas the front suspension ECU 510 is configured or programmed to perform the function of the aforementioned second control circuit. Therefore, in the present preferred embodiment, a combination of the front suspension ECU 510 and the main ECU 530 has the functions of the aforementioned "controller".

The front suspension ECU 510 is connected to a plurality of switches 461 to 465, the pressure sensor 412, the stroke sensor 442, and the solenoids 401 to 405. The plurality of switches 461 to 465 are provided in the cabin 105 of the work vehicle 100. The plurality of switches 461 to 465 include a suspension-auto switch (SW) 461, a suspension-OFF switch 462, a suspension-soft switch 463, a suspension-hard switch 464, and a suspension-manual switch 465.

The main ECU 530 is connected to an electronic meter 160, a buzzer 170, and an angle-of-turn sensor 190. In accordance with a command from the main ECU 530, the electronic meter 160 displays the operating status of the work vehicle 100. The electronic meter 160 displays the operating status of the front suspension, the bi-speed turn operating status, and so on, for example. The buzzer 170 generates an alarm sound in accordance with a command from the main ECU 530. The buzzer 170 may generate an alarm sound while the user is manually adjusting the vehicle height, for example. The angle-of-turn sensor 190 measures the angle of turn (steering angle) of the front wheels 104F or the angle of rotation of the steering wheel, and outputs a signal indicating the result of measurement to the main ECU 530.

During travel of the work vehicle 100, the engine ECU 520 consecutively sends information representing the revolutions of the engine per unit time to the front suspension ECU 510. The information of engine revolutions is used in the relief-stopping control described below.

During travel of the work vehicle 100, the main ECU 530 consecutively sends to the front suspension ECU 510 information representing: the state of a shuttle lever (forward travel/backward travel); the speed of the work vehicle 100 (vehicle speed); the temperature of the hydraulic oil (oil temperature) in the hydraulic circuit 400; the states of braking (brakes) on the right and left wheels; and the bi-speed turn operating status. Upon detecting that the steering angle of the front wheels 104F or the angle of rotation of the steering wheel has exceeded the reference angle based on the signal which is output from the angle-of-turn sensor 190, the main ECU 530 causes the running gear 104 to operate in the small turn mode. As a result, a bi-speed turn is made. The main ECU 530 sends information indicating that a bi-speed turn is to be made to the front suspension ECU 510. The main ECU 530 may control the braking devices to apply braking to the inner rear wheel 104R or both of the right and left rear wheels 104R during a bi-speed turn. These controls are to be made in accordance with user-designated settings concerning bi-speed turns.

Figure 10:
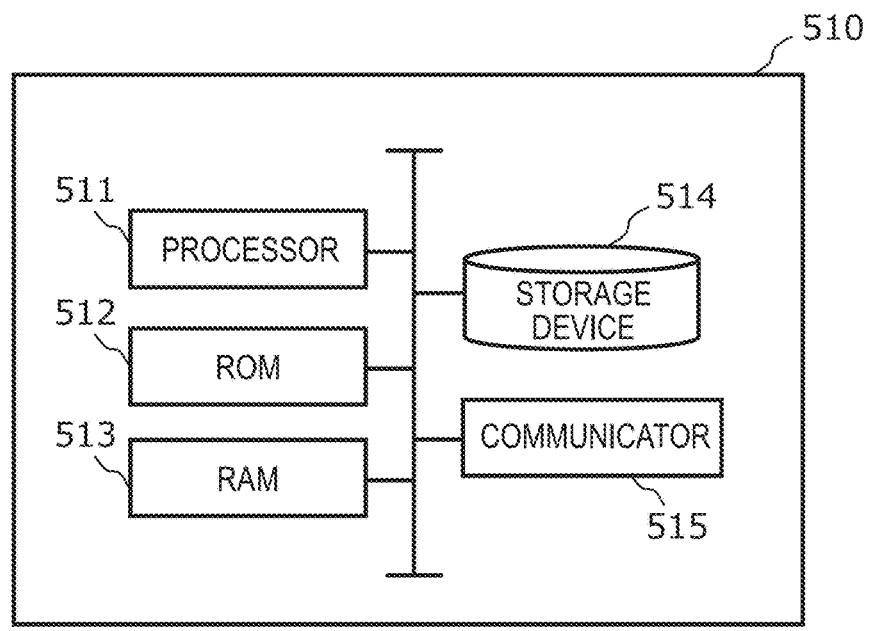
FIG. 10 is a block diagram showing a hardware configuration of an ECU.

FIG. 10 is a block diagram showing a hardware configuration of the front suspension ECU 510. The front suspension ECU 510 includes a processor 511, a ROM 512, a RAM 513, a storage device 514, and a communicator 515. These component elements are connected so as to be capable of communicating with one another via a bus.

The processor 511 is a semiconductor integrated circuit including a central processing unit (CPU), for example. The processor 511 may be implemented as a microprocessor or a microcontroller. Alternatively, the processor 511 may be implemented as an FPGA (Field Programmable Gate Array), a GPU (Graphics Processing Unit), an ASIC (Application Specific Integrated Circuit), or an ASSP (Application Specific Standard Product) incorporating a CPU; or a combination of two or more circuits selected from among such circuits. The processor 511 executes a computer program in which instructions for performing at least one process are stated, this being stored in the ROM 512, and performs a desired process.

The ROM 512 may be a writable memory (e.g., a PROM), a rewritable memory (e.g., a flash memory), or a read-only memory, for example. The ROM 512 stores a program to control the operation of the processor 511. The RAM 513 provides a work area for a control program stored in the ROM 512 to be laid out once at boot time. Each of the ROM 512 and the RAM 513 does not need to be a single storage medium, but may be an aggregation of multiple storage media. The storage device 514, which may be, e.g. a magnetic storage device or a semiconductor storage device, stores data generated through computation by the processor 511. An example of a magnetic storage device is a hard disk drive (HDD). An example of a semiconductor storage device is a solid state drive (SSD).

The communicator 515 is a communication module to perform communications with the engine ECU 520 and the main ECU 530. The communicator 515 performs communication in accordance with CAN or other vehicle bus standards, for example.

The engine ECU 520 and the main ECU 530 also have a similar hardware configuration to the configuration shown in FIG. 10. Therefore, descriptions concerning the hardware configuration of the engine ECU 520 and the main ECU 530 will be omitted.

Figure 11:
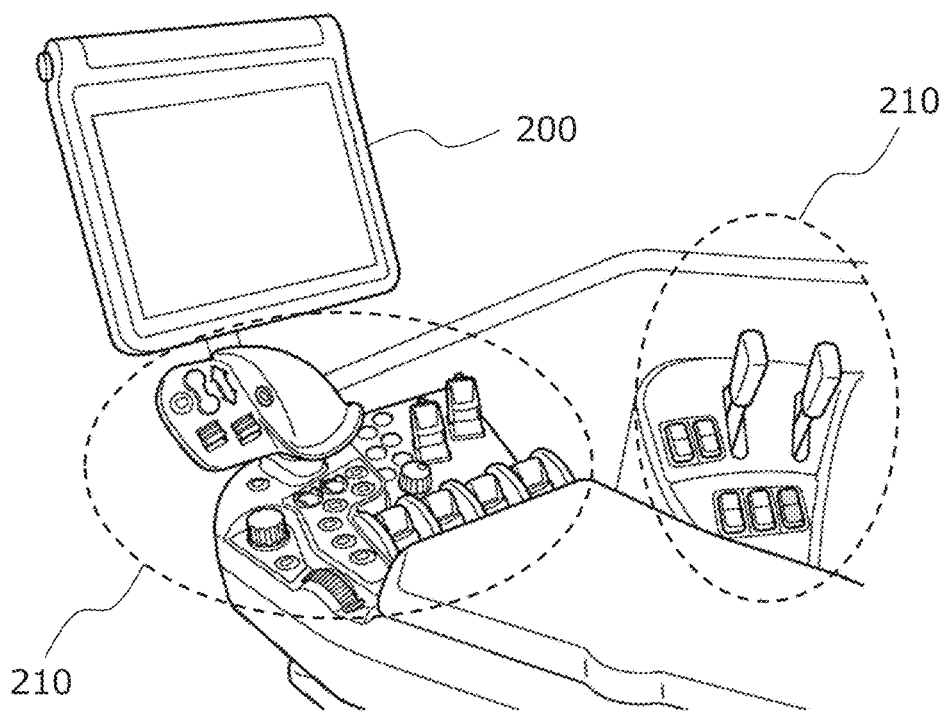
FIG. 11 is a schematic diagram showing an example of an operational terminal and operation switches to be provided in the cabin.

FIG. 11 is a schematic diagram showing an example of the operational terminal 200 and operation switches 210 to be provided in the cabin 105. In the cabin 105, switches (including levers) 210, which are a multitude of switches that are manipulable to the user, are disposed. The operation switches 210 may include, for example, a switch to select the gear shift as to a main gear shift or a range gear shift, a switch (shuttle lever) to switch between forward travel and backward travel, a switch to switch between a bi-speed turn enabled state and a bi-speed turn disabled state, a switch to switch between the presence or absence of braking and the degree of braking on the rear wheels 104R during a bi-speed turn, a switch to switch the mode of the front suspension, a switch to adjust the damping force of the front suspension, a switch to raise or lower the implement 300, and so on. Among these switches, switches 461, 462 and 465 to switch the mode of the front suspension, and switches 463 and 464 to adjust the damping force of the front suspension are shown in FIG. 9.

The suspension-auto switch 461 is a switch to enable the automatic control on the front suspension by the ECU 510. The suspension-OFF switch 462 is a switch to disable the automatic control on the front suspension. The suspension-manual switch 465 is a switch to enable the function of manually setting the front suspension. The suspension-soft switch 463 is a switch to reduce the damping force of the front suspension. The suspension-hard switch 464 is a switch to increase the damping force of the front suspension. The front suspension ECU 510 operates based on signals which are output from these switches.

Hereinafter, specific examples of the operation of the front suspension ECU 510 will be described. The front suspension ECU 510 according to the present preferred embodiment is able to perform controls (1) to (8) below, for example. Note that controls (1) to (8) below are mere examples, and the ECU 510 may be configured to perform only some of controls (1) to (8) below.

(1) Automatic Vehicle Height Control

When the suspension-auto switch 461 is set ON, the ECU 510 performs an automatic vehicle height control. The ECU 510 prevents the suspension cylinders 441 from being extended all out or retracted all in because of fluctuations in the load on the front wheels 104F of the work vehicle 100, and controls each cylinder 441 to maintain a state of extending or retracting always near midway of the stroke on average. Specifically, the ECU 510 calculates a stroke length based on a signal which is output from the stroke sensor 442, and controls the suspension based on the calculated stroke length. For example, if the calculated stroke length is longer than the midway stroke length, the ECU 510 turns the suspension lowering solenoid 402 ON to retract the cylinders 441 and lower the vehicle height. Conversely, if the calculated stroke length is shorter than the midway stroke length the ECU 510 turns the suspension raising solenoid 401 ON to extend the cylinders 441 and raise the vehicle height. As a result, the cylinders 441 are always allowed to make a relatively large move in the extending direction or in the retracting direction, thus maximizing the suspension's effect of vibration reduction.

Now, with reference to FIG. 12 and FIG. 13, an exemplary method of calculating the stroke length of the suspension will be described.

Figure 12:
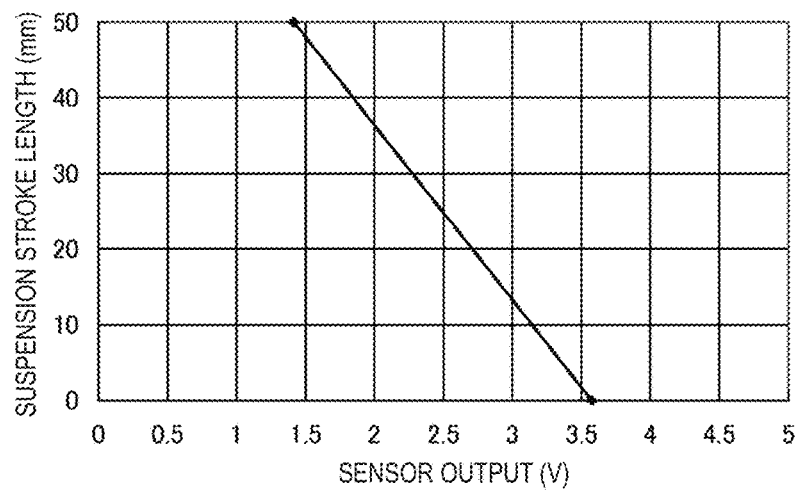
FIG. 12 is a diagram showing an exemplary relationship between the output voltage of a stroke sensor and the stroke length of the suspension.

FIG. 12 is a diagram showing an exemplary relationship between the output voltage of the stroke sensor 442 and the stroke length of the suspension. The suspension cylinders 441 in this example has a difference in length of about 50 mm between the most extended state and the most retracted state. In FIG. 12, the amount of extension of the cylinder 441 is expressed as a stroke length against the length in the most retracted state. The ECU 510 calculates the stroke length from the output voltage of the stroke sensor 442, based on the data (e.g., a table or a mathematical function) recorded in the storage device representing the relationship shown in FIG. 12. The ECU 510 may calculate the stroke length as often as about 20 times in one second, for example.

Figure 13:
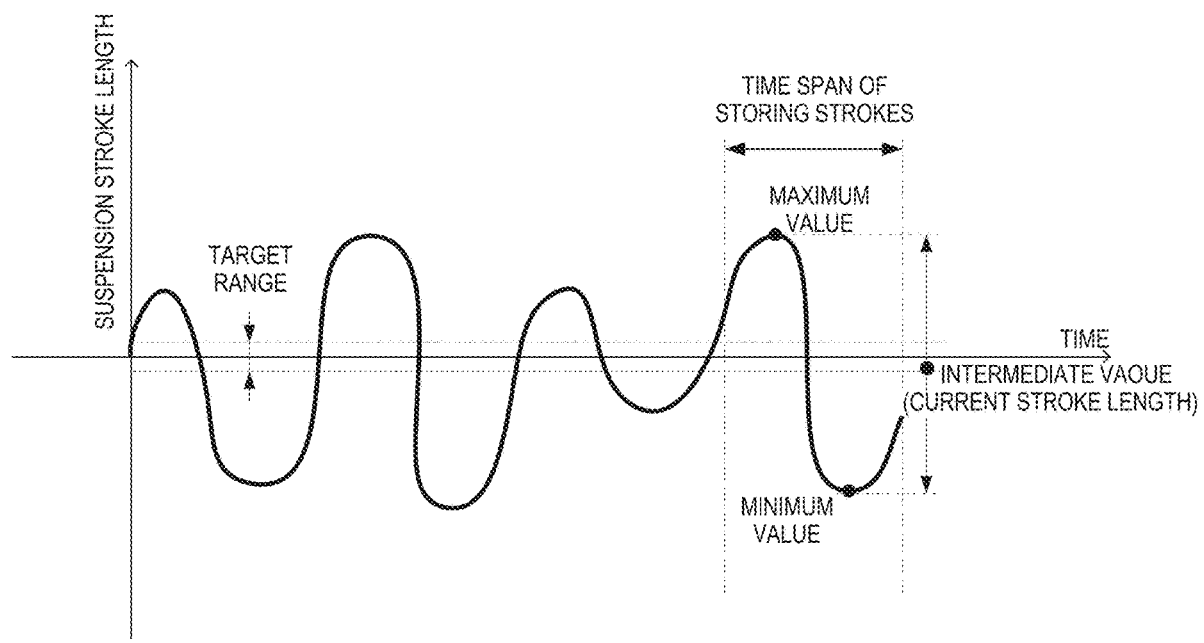
FIG. 13 is a graph showing an example of change in stroke length over.

FIG. 13 is a graph showing an example of change in stroke length over time. The ECU 510 stores stroke lengths over a period of, e.g., about 2 seconds in the past (about 40 data points) in a memory, and defines an intermediate value between the maximum value and the minimum value in this period as a current stroke length. Regarding a target range which is supposed to be the neighborhood of the center movable range of stroke length, for any current stroke length that is outside the target range, the ECU 510 controls it to be closer into the target range.

(2) Damping Force Switching Control (i) In order to ensure that a proper amount of damping is always attained irrespective of an increase or decrease in the load on the front wheels 104F, the ECU 510 performs a control of switching the aperture size of the variable orifice 409 to regulate the flow rate of hydraulic oil going in and out of the cylinder 441. Specifically, in accordance with the pressure of hydraulic oil as measured by the pressure sensor 412, the ECU 510 switches the aperture size of the variable orifice 409. This solves problems such as difficulties to stop wobbling of the body of the vehicle under a large load, or the excessive stiffness of the suspension preventing vibrations from being absorbed in the presence of a light load, and makes it possible to constantly maintain a high suspension performance.

(ii) Through the user's manipulations of the switches 463 and 464, stiffness (i.e., damping force) of the suspension can be changed in three steps of "hard", "normal", and "soft". When the user turns the suspension-soft switch 463 ON, the ECU 510 turns both of the medium damping force-selecting solenoid 404 and the large damping force-selecting solenoid 405 OFF to increase the flow rate through the variable orifice 409. This results in the stiffness of the suspension being "soft". When the user turns neither the suspension-soft switch 463 nor the suspension-hard switch 464 ON, the ECU 510 turns the medium damping force-selecting solenoid 404 ON and the large damping force-selecting solenoid 405 OFF, so that the flow rate through the variable orifice 409 is intermediate. This results in the stiffness of the suspension being "normal". When the user turns the suspension-hard switch 464 ON, the ECU 510 turns the medium damping force-selecting solenoid 404 OFF and the large damping force-selecting solenoid 405 ON to make the flow rate through the variable orifice 409 small. This results in the stiffness of the suspension being "hard". With this function, regardless of how the work vehicle 100 is equipped or how the work vehicle 100 is supposed to work, the body of the vehicle will always achieve stable behavior to the feeling of the user.

(3) Anti-Dive Control

During a braking manipulation, in order to prevent a sudden deceleration G-force from causing the suspension to be completely retracted instantaneously, the ECU 510 performs a control of switching the aperture size of the variable orifice 409, which regulates the flow rate of hydraulic oil. For example, the ECU 510 calculates an acceleration based on temporal change in the traveling speed of the work vehicle 100, and adjusts the aperture size of the variable orifice 409 in accordance with the magnitude of a G-force that is estimated from the acceleration. This enhances the behavioral stability of the body of the vehicle.

(4) Automatic Suspension Locking Control (i) When manipulating a pallet fork, a front loader, etc., ease of manipulation will be degraded if the change in the vehicle height at the front of the work vehicle 100 is too large. Therefore, when the vehicle speed equals a certain value or lower, the ECU 510 automatically immobilizes the extension/retraction action of the suspension cylinders 441, i.e., locks the suspension (suspension locking), to prevent further change in the vehicle height. Once travel is begun and the vehicle speed increases, the ECU 510 automatically disengages suspension locking, thus enabling the suspension's effect of vibration reduction. In one implementation, upon detecting a switch from backward travel to forward travel based on the state of the shuttle lever, the ECU 510 may abstain from locking the suspension (i.e., the suspension remains enabled) for a certain period of time after switching, even if the vehicle speed becomes equal to or lower than the certain value. This allows for alleviating the shock when switching from backward travel to forward travel.

(ii) In order to reduce fluctuations in plowing depth during plow work, when the three-point link is in a lowered state (e.g., the lower link being level or lower), the ECU 510 automatically locks the suspension. When the three-point link is raised, the ECU 510 automatically unlocks the suspension. This allows for reducing vibrations during a turning operation or during a move.

(iii) During draft control, if the towing load becomes higher than a threshold, the ECU 510 automatically locks the suspension. When a certain period of time (e.g., about 3 seconds) has passed since the load became equal to or lower than the threshold, or if the lift arm is located near the upper end of the controllable range (e.g., the lift arm being in a range of 10 degrees from the upper end), the ECU 510 unlocks the suspension.

(5) Manual Suspension Locking

When the user turns the suspension-OFF switch 462 ON, the ECU 510 turns the suspension unlocking solenoid 403 OFF to immobilize the extension/retraction action of the suspension cylinders 441. This disables suspension functionality, and reduces change in vehicle height, which will be effective in situations where implement stability is important, such as during plowing work in soft terrains.

(6) Manual Up and Down Operation

An operator is able to extend or retract the suspension cylinders 441 through manipulations of switches. In the manual operation mode, automatic vehicle height control is not at work, and therefore the height of the front of the work vehicle 100 can be fixed to any arbitrary height.

(7) Raising Restriction (Relief-Stopping Control)

When the load on the front wheels 104F exceeds the tolerable range, the suspension can no longer be raised, and the relief valves 426 and 427 of the hydraulic circuit 400 keep operating. In order to avoid this state, and prevent an excessive load from acting on the hydraulic pump 420, the ECU 510 inhibits any raising output of the cylinders 441 when the load on the front wheels 104F exceeds the tolerable range. In the case where the pump 420 has a low performance (e.g., the oil temperature is high and the engine revolutions are low), the raising output of the cylinders 441 is inhibited to prevent the flow rate of hydraulic oil from becoming less than is needed for the power steering device.

(8) Vehicle Height Control during a Bi-Speed Turn

When a bi-speed turn is being made, the ECU 510 automatically retracts the suspension cylinders 441, and fixes the vehicle height in a low state. Once the bi-speed turn is finished, the ECU 510 restores the original state of the suspension cylinders 441, and restarts automatic control of the suspension. Through this control, tilt of the vehicle during a bi-speed turn is reduced or prevented, and the turning stability can be enhanced.

Hereinafter, some example methods of controlling the vehicle height when making a bi-speed turn will be described.

Figure 14:
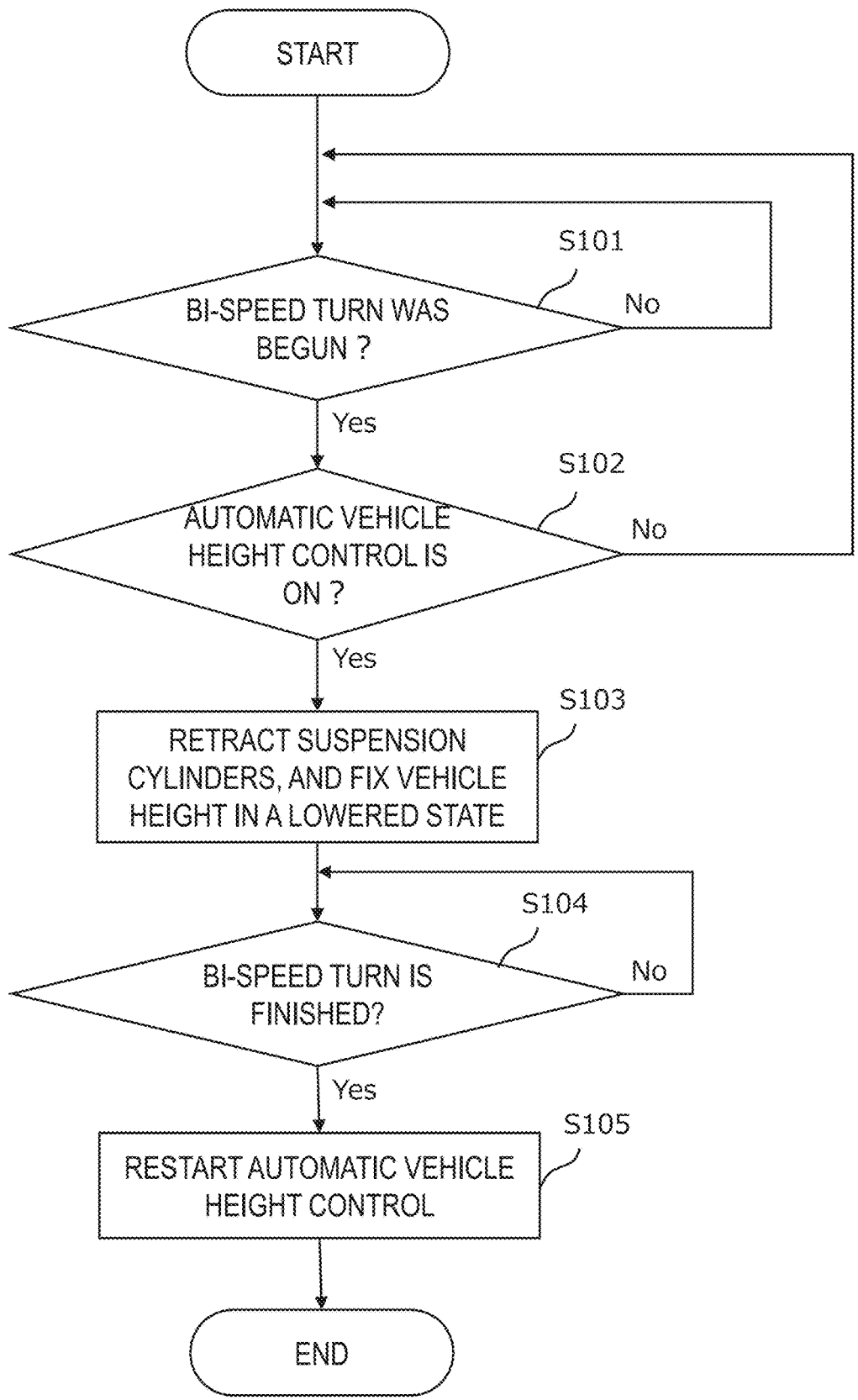
FIG. 14 is a flowchart showing one example of the operation of the ECU.

FIG. 14 is a flowchart showing an example of vehicle height control operation executed by the ECU 510 when a bi-speed turn is made. In the example shown in FIG. 14, during travel of the work vehicle 100, based on information representing the bi-speed turn operating status which is sent from the main ECU 530, the ECU 510 determines whether a bi-speed turn has been begun or not (step S101). Upon determining that a bi-speed turn has been begun, the ECU 510 determines whether automatic vehicle height control is ON or not (step S102). If automatic vehicle height control is OFF, control returns to step S101. If automatic vehicle height control is ON, the ECU 510 retracts the suspension cylinders 441, and fixes the vehicle height in a lowered state (step S103). The ECU 510 may fix the suspension cylinders 441 in the most retracted state, or adjust the amount of lowering the vehicle height in accordance with conditions such as the vehicle speed or turning radius. Based on information representing the bi-speed turn operating status which is sent from the main ECU 530, the ECU 510 determines whether the bi-speed turn has been finished or not (step S104). When the bi-speed turn is finished, the ECU 510 restarts automatic vehicle height control (step S105).

Through the above operation, if a bi-speed turn is made while automatic vehicle height control is being performed, the ECU 510 automatically lowers the vehicle height (to, e.g., the lowest state). As a result, the turning stability can be improved.

Figure 15:
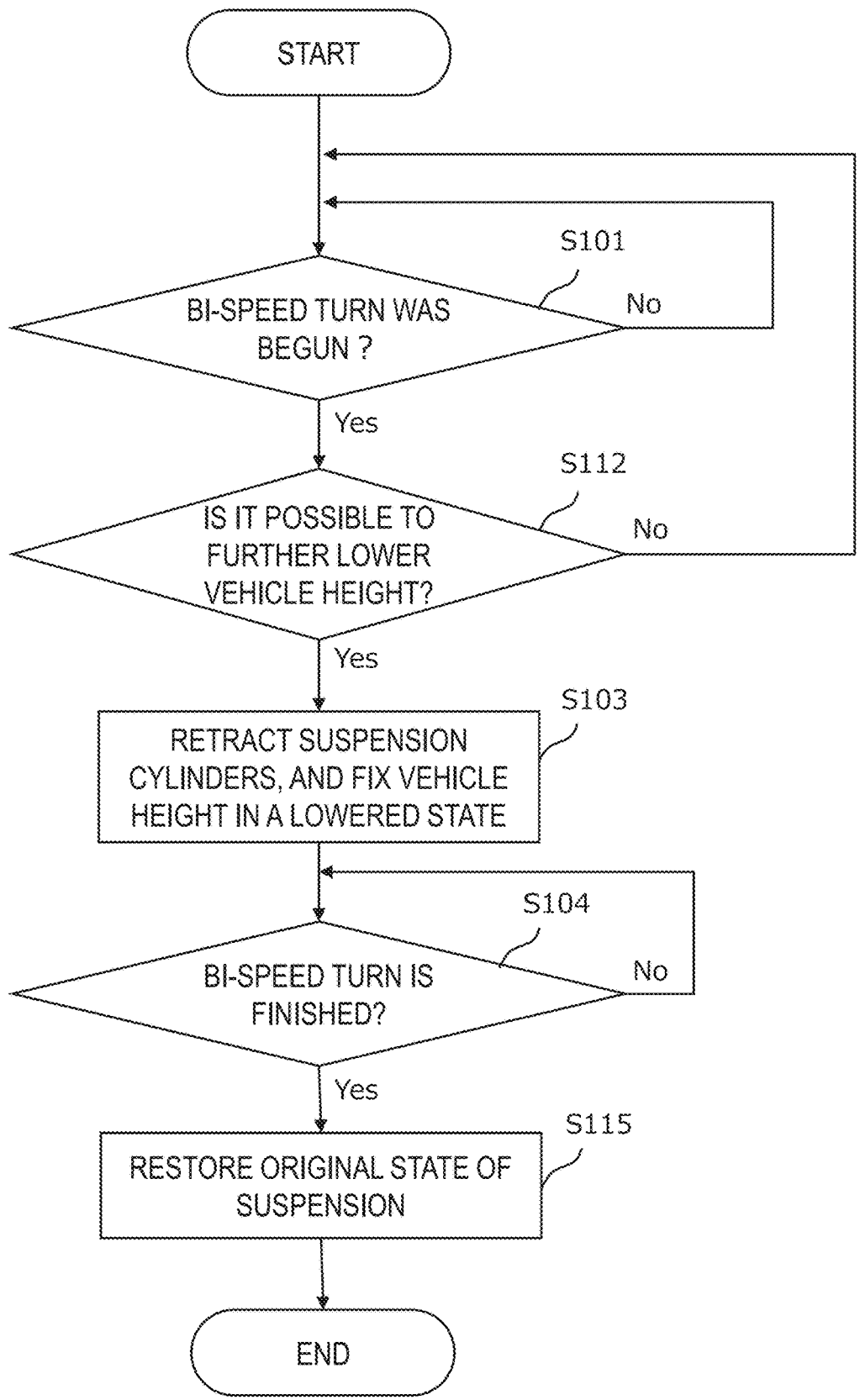
FIG. 15 is a flowchart showing another example of the operation of the ECU.

FIG. 15 is a flowchart showing another example of the operation of the ECU 510. The flowchart shown in FIG. 15 is obtained by replacing steps 5102 and 5105 in the flowchart of FIG. 14 with steps 5112 and 5115, respectively. In the example of FIG. 15, when a bi-speed turn is begun, the ECU 510 determines whether it is possible to further lower the vehicle height by retracting the suspension cylinders 441 (step S112). For example, if automatic vehicle height control is ON, or automatic vehicle height control is OFF but the vehicle height is not in the lowest state, it is deemed possible to further lower the vehicle height. If it is possible to further lower the vehicle height, similarly to the earlier example, the ECU 510 retracts the suspension cylinders 441, and fixes the vehicle height in a lowered state (step S103). In this example, too, the ECU 510 may fix the suspension cylinders 441 in the most retracted state, or adjust the amount of lowering the vehicle height in accordance with conditions such as the vehicle speed or turning radius. Thereafter, when the bi-speed turn is finished, the ECU 510 restores the state of the suspension before the turn (step S115).

With the operation shown in FIG. 15, irrespective of whether automatic vehicle height control is ON or not, when a bi-speed turn is made, the ECU 510 automatically lowers the vehicle height (to, e.g., the lowest state). As a result, even when the suspension is locked with the vehicle height being high, tilting of the body of the vehicle during a bi-speed turn is reduced or prevented, and the turning stability can be improved.

Figure 16:
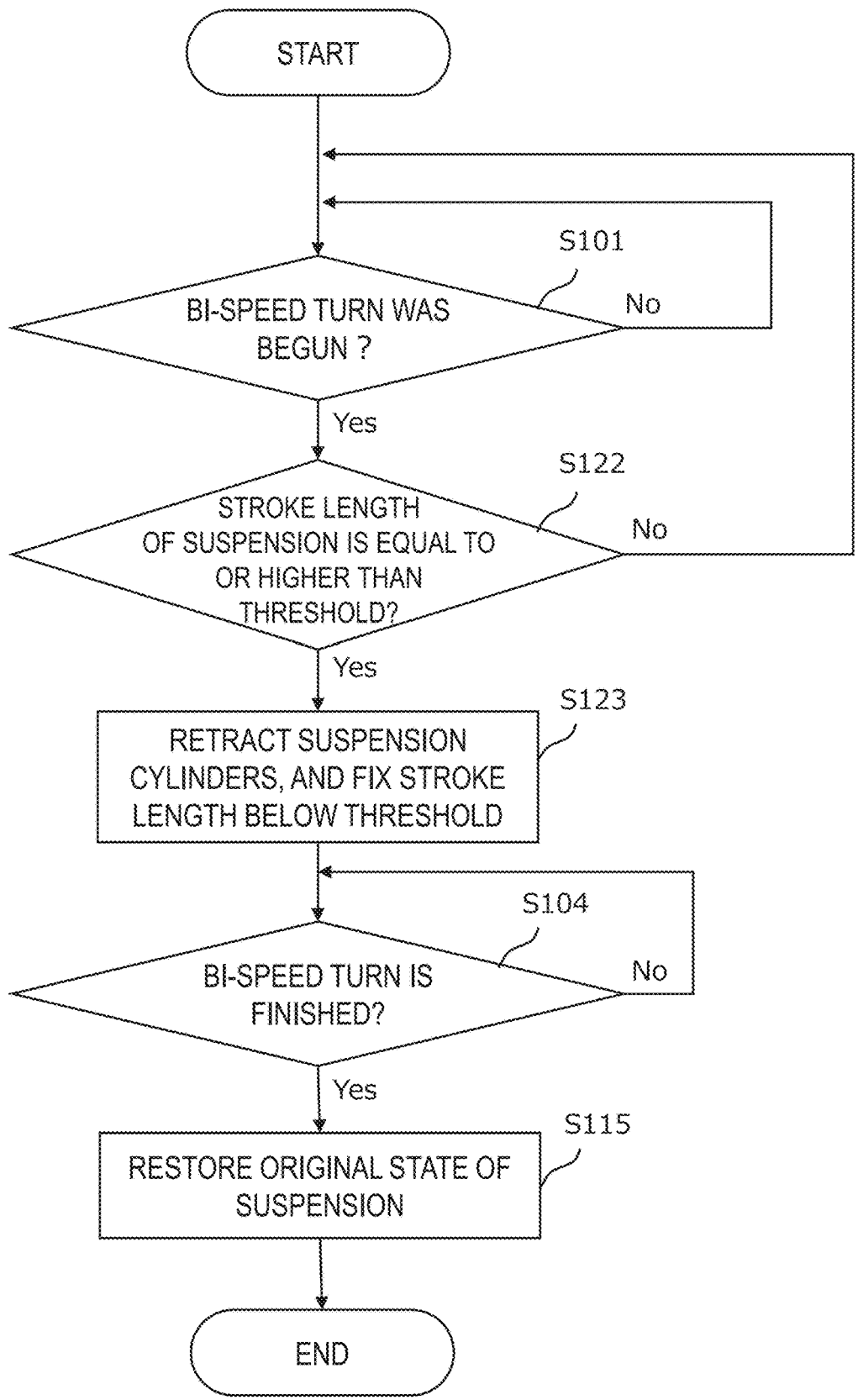
FIG. 16 is a flowchart showing still another example of the operation of the ECU.

FIG. 16 is a flowchart showing still another example of the operation of the ECU 510. The flowchart shown in FIG. 16 is obtained by replacing steps 5112 and 5103 in the flowchart of FIG. 15 with steps 5122 and 5123, respectively. In the example of FIG. 16, when a bi-speed turn is begun, the ECU 510 determines whether the stroke length of the suspension is equal to or higher than a threshold or not (step S122). The threshold may be, for example, a lower limit value of stroke length that is tolerated for a stable bi-speed turn to be made. The ECU 510 may determine the threshold in accordance with the speed of the work vehicle 100 or turning radius. The stroke length is determined based on a signal which is output from the stroke sensor 442. When the stroke length is below the threshold, control returns to step S101. If the stroke length is equal to or higher than the threshold, the ECU 510 retracts the suspension cylinders 441, and fixes the stroke length below the threshold (step S103). In this example, too, the ECU 510 may fix the suspension cylinders 441 in the most retracted state, or adjust the amount of lowering the vehicle height in accordance with conditions such as the vehicle speed or turning radius. Thereafter, when the bi-speed turn is finished, the ECU 510 restores the state of the suspension before the turn (step 5115).

With the operation shown in FIG. 16, vehicle height adjustments are made only when the stroke length of the suspension cylinders 441 is equal to or higher than the threshold. The threshold can be set in accordance with conditions such as the vehicle speed or turning radius. As a result, the condition for lowering the center of gravity of the vehicle body 101 can be flexibly set in accordance with the vehicle speed, the turning radius, or the like.

In the above examples, the main ECU 530 causes the running gear 104 to operate in the small turn mode when the angle of rotation of the steering wheel or the steering angle of the front wheels has exceeded a reference angle. The front suspension ECU 510 causes the suspension device to lower the center of gravity of the vehicle body 101 when the small turn mode is begun while the height of the center of gravity of the vehicle body is higher than the reference height. The main ECU 530 may control the braking devices to apply braking to the inner one of the two rear wheels 104R in the small turn mode. The main ECU 530 may control the presence or absence of braking and the intensity of braking on the inner rear wheel 104R in accordance with switch manipulations by the user. In accordance with the presence or absence of braking or intensity of braking on the rear wheels 104R, the front suspension ECU 510 may change the amount of lowering the center of gravity or the condition for lowering the center of gravity. For example, in the case where a bi-speed turn is made with the braking of the rear wheels 104R, the amount of lowering the center of gravity may be increased or the condition for lowering the center of gravity may be more relaxed than in the case where a bi-speed turn is made without braking the rear wheels 104R.

In the examples shown FIG. 14 to FIG. 16, a control to lower the vehicle height is performed only when making a bi-speed turn. However, a similar control may be applied also when not making a bi-speed turn. For example, the ECU 510 may calculate an angular velocity of yawing during a turn, based on a signal which is output from a sensor that can measure angular velocity (e.g., an IMU included in the work vehicle 100), and perform a similar control when the angular velocity becomes equal to or higher than a threshold.

Figure 17:
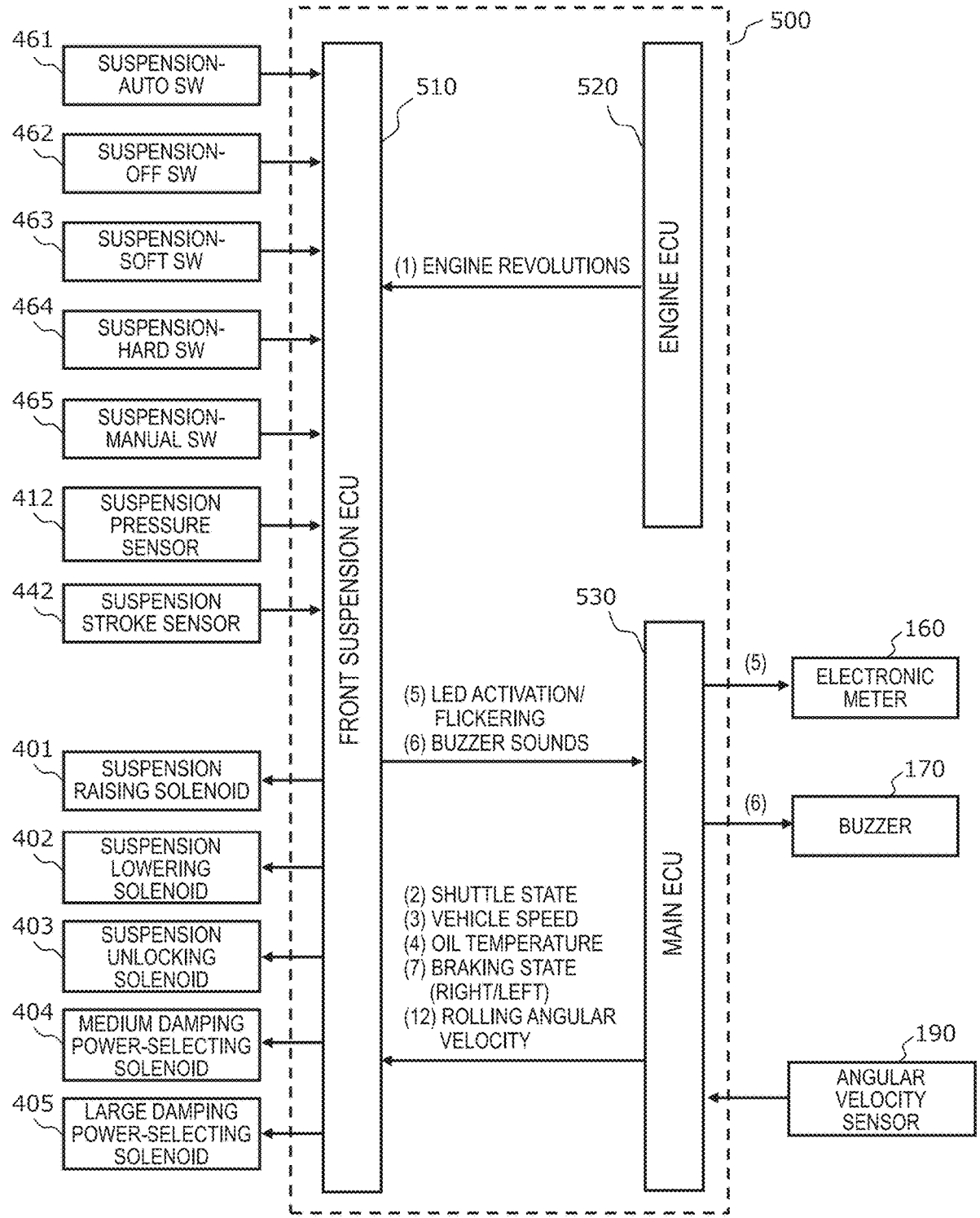
FIG. 17 is a block diagram showing an exemplary configuration where the ECU controls the front suspension based on a signal which is output from an IMU.

FIG. 17 is a block diagram showing an exemplary configuration where the ECU 510 controls the front suspension based on an angular velocity of yawing. In the example shown in FIG. 17, the main ECU 530 relies on a signal which is output not from the angle-of-turn sensor 190 but from the angular velocity sensor 192 to determine an angular velocity of yawing during a turn, and sends information representing this angular velocity to the front suspension ECU 510. Based on the information representing the angular velocity, the front suspension ECU 510 determines whether the work vehicle 100 is in a state of a small turn or not.

Figure 18:
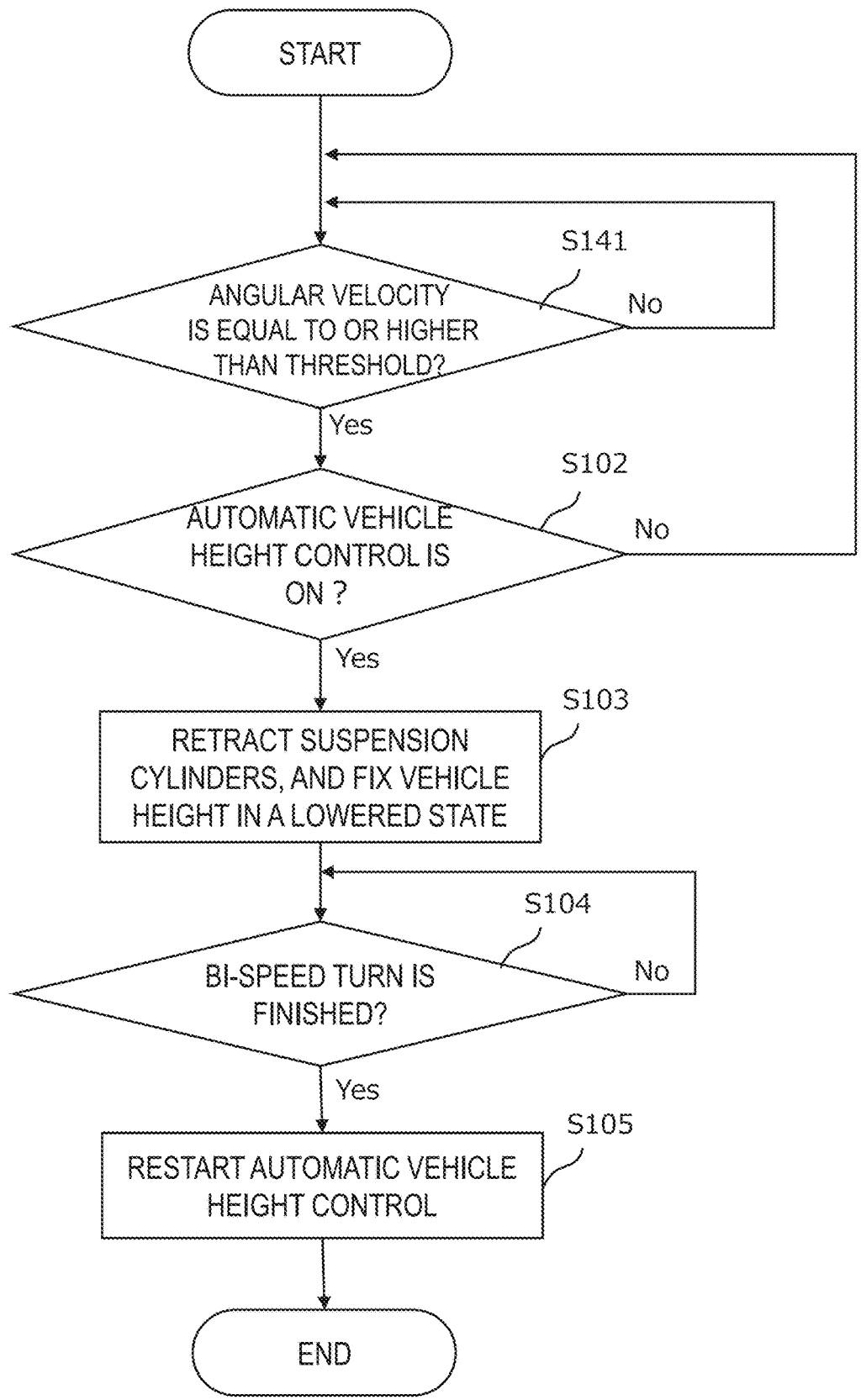
FIG. 18 is a flowchart showing an example of vehicle height control based on an angular velocity of yawing of the work vehicle.

FIG. 18 is a flowchart showing an example of vehicle height control based on the angular velocity of yawing of the work vehicle 100. The flowchart shown in FIG. 18 is obtained by replacing step S101 in the flowchart shown in FIG. 14 with step S141. In the example of FIG. 18, the ECU 510 determines whether an angular velocity of yawing as measured by the angular velocity sensor is equal to or higher than a threshold or not. The threshold may be set to a different value depending on the speed of the work vehicle 100, presence or absence of the implement 300, or the like. For example, the threshold may be made smaller as the speed increases. Alternatively, the threshold may be made smaller when the implement 300 is attached than when the implement 300 is not attached. If the angular velocity is equal to or higher than the threshold, control proceeds to step S102. The subsequent operation is similar to the operation illustrated in FIG. 14.

With the control shown in FIG. 18, regardless of the bi-speed turn operating status, the vehicle height is lowered whenever the angular velocity during a turn is high, whereby the turning stability can be enhanced. Therefore, even in a work vehicle that lacks bi-speed turn functionality, for example, the traveling stability during a rapid turn can be improved. It may be not only in FIG. 14, but also in the example of FIG. 15 or FIG. 16, that the operation of step S101 can be replaced by the operation of step 5141 shown in FIG. 18. A similar control may be performed based on an angular velocity of rolling, rather than yawing, of the work vehicle 100.

The ECU 510 may perform a similar control based on a signal which is output from a sensor that measures the centrifugal acceleration of the work vehicle 100 during a turn. For example, the ECU 510 may perform a control of lowering the center of gravity of the vehicle body 101 when a centrifugal acceleration as measured by a sensor (such as a gyroscope that is included in an IMU provided in the work vehicle 100) is higher than a threshold. Such a control allows the turning stability to be improved without calculating an angular velocity of yawing or rolling.

Instead of the control of extending or retracting the suspension in each of the above examples, other methods may also be used to control the height of the center of gravity of the vehicle body 101. For example, the height of the center of gravity may be controlled by using a mechanism to raise or lower a weight that is provided at a predetermined position (e.g., the bottom or the front) of the work vehicle 100.

The controller to perform vehicle height control during a small turn in the above preferred embodiment can be mounted on a work vehicle lacking such functionality as an add-on. Such a controller may be manufactured and sold independently from the work vehicle. A computer program for use in such a controller may also be manufactured and sold independently from the work vehicle. The computer program may be provided in a form stored in a computer-readable, non-transitory storage medium, for example. The computer program may also be provided through downloading via telecommunication lines (e.g., the Internet).

The techniques according to the present disclosure are applicable to work vehicles for use in agricultural applications, e.g., tractors, rice transplanters, combines, harvesters, vehicles for crop management, vegetable transplanters, and riding mowers. The techniques according to the present disclosure are also applicable to work vehicles for use in non-agricultural applications, e.g., construction vehicles or snowplow vehicles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle comprising:
a vehicle body;
running gear to cause the vehicle body to travel;
a linkage via which an implement is linked to the vehicle body;
a height adjuster to change a height of a center of gravity of the vehicle body; and
a controller configured or programmed to, in accordance with at least one of a turning radius and an angular velocity of the vehicle body during a turn, control the height adjuster to maintain or lower the height of the center of gravity; wherein
the controller is configured or programmed to:
control the height adjuster to lower the center of gravity when a state of a small turn where the turning radius is smaller than a reference radius is entered during a turn, and if the height of the center of gravity is higher than a reference height;
change at least one of an amount of lowering the center of gravity and the reference height, in accordance with at least one of the turning radius, the angular velocity, and a weight of the work vehicle; and
change at least one of the amount of lowering the center of gravity, the reference height, and the reference radius, in accordance with a type of the implement or a presence or an absence of the implement.

2. The work vehicle of claim 1, wherein the controller is configured or programmed to change the reference radius, in accordance with at least one of a speed and the weight of the work vehicle.

3. The work vehicle of claim 1, wherein
the height adjuster includes a suspension to change the height of a front of the vehicle body; and
the controller is configured or programmed to change the height of the center of gravity by controlling the suspension.

4. The work vehicle of claim 3, wherein,
the running gear includes two front wheels and two supports supporting the two front wheels; and
the suspension includes two hydraulic suspension cylinders connecting the two supports to the vehicle body, and a hydraulic circuit connected to the two hydraulic suspension cylinders.

5. The work vehicle of claim 4, wherein, when the state of the small turn where the turning radius is smaller than the reference radius is entered during the turn, the controller is configured or programmed to control the hydraulic circuit to retract the two hydraulic suspension cylinders and fix the two hydraulic suspension cylinders that have been retracted.

6. The work vehicle of claim 1, further comprising a steering wheel, wherein
the running gear includes two front wheels with a variable steering angle and two rear wheels, and is operable in a small turn mode where a rotational speed of an outer one of the two front wheels is smaller than a rotational speed of the two rear wheels during a turn so that the turning radius becomes smaller than a reference radius; and the controller includes:
a first control circuit to cause the running gear to operate in the small turn mode when an angle of rotation of the steering wheel or the steering angle of the front wheels has exceeded a reference angle; and
a second control circuit to cause the height adjuster to lower the center of gravity when the small turn mode is begun while the height of the center of gravity of the vehicle body is higher than a reference height.

7. The work vehicle of claim 6, wherein
the running gear is operable to, in the small turn mode, automatically brake an inner one of the two rear wheels;
the first control circuit is configured or programmed to control a presence or an absence of braking or an intensity of braking on the inner rear wheel; and
the second control circuit is configured or programmed to change at least one of an amount of lowering the center of gravity and a reference height in accordance with the presence or the absence of braking or the intensity of braking.

8. The work vehicle of claim 1, further comprising an angular velocity sensor to measure the angular velocity of the vehicle body, wherein
when an angular velocity of yawing of the vehicle body as measured by the angular velocity sensor has become equal to or greater than a threshold and if the height of the center of gravity is higher than the reference height, the controller is configured or programmed to cause the height adjuster to lower the center of gravity.

9. A controller to control a work vehicle including a vehicle body, running gear to cause the vehicle body to travel, a linkage via which an implement is linked to the vehicle body, and a height adjuster to change a height of a center of gravity of the vehicle body, the controller comprising:
one or more processors; and
one or more memories storing a computer program to be executed by the one or more processors; wherein
the one or more processors is configured or programmed to:
acquire, during a turn, information concerning at least one of a turning radius and an angular velocity of the vehicle body;
control the height adjuster to maintain or lower the height of the center of gravity in accordance with the information;
control the height adjuster to lower the center of gravity when a state of a small turn where the turning radius is smaller than a reference radius is entered during a turn, and if the height of the center of gravity is higher than a reference height; and
change at least one of an amount of lowering the center of gravity and the reference height, in accordance with at least one of the turning radius, the angular velocity, and a weight of the work vehicle; and
change at least one of the amount of lowering the center of gravity, the reference height, and the reference radius, in accordance with a type of the implement or a presence or an absence of the implement.

* * * * *